United States Patent
Mironica

(10) Patent No.: US 11,468,658 B2
(45) Date of Patent: Oct. 11, 2022

(54) SYSTEMS AND METHODS FOR GENERATING TYPOGRAPHICAL IMAGES OR VIDEOS

(71) Applicant: Adobe Inc., San Jose, CA (US)

(72) Inventor: Ionut Mironica, Bucharest (RO)

(73) Assignee: Adobe Inc., San Jose, CA (US)

( * ) Notice: Subject to any disclaimer, the term of this patent is extended or adjusted under 35 U.S.C. 154(b) by 181 days.

(21) Appl. No.: 16/928,881

(22) Filed: Jul. 14, 2020

(65) Prior Publication Data
US 2022/0019830 A1    Jan. 20, 2022

(51) Int. Cl.
| | |
|---|---|
| *G06V 10/20* | (2022.01) |
| *G06F 40/109* | (2020.01) |
| *G06N 3/08* | (2006.01) |
| *G06V 10/44* | (2022.01) |
| *G06V 30/40* | (2022.01) |

(52) U.S. Cl.
CPC ......... *G06V 10/255* (2022.01); *G06F 40/109* (2020.01); *G06N 3/08* (2013.01); *G06V 10/443* (2022.01); *G06V 30/40* (2022.01)

(58) Field of Classification Search
CPC .... G06V 10/255; G06V 10/443; G06V 30/40; G06F 40/109; G06N 3/08
See application file for complete search history.

(56) References Cited

U.S. PATENT DOCUMENTS

| | | | |
|---|---|---|---|
| 9,483,855 B2 * | 11/2016 | Ying | G06T 11/60 |
| 2017/0004374 A1 * | 1/2017 | Osindero | G06F 16/5846 |

FOREIGN PATENT DOCUMENTS

WO    2016117836    *   7/2016

OTHER PUBLICATIONS

Computer English Translation of Japanese Patent No. JP 2019-220098 A , pp. 1-10. (Year: 2019).*

* cited by examiner

*Primary Examiner* — Daniel G Mariam
(74) *Attorney, Agent, or Firm* — Kilpatrick Townsend & Stockton LLP

(57) ABSTRACT

This disclosure involves automatically generating a typographical image using an image and a text document. Aspects of the present disclosure include detecting a region of interest from the image and generating an object template from the detected region of interest. The object template defines the areas of the image, in which words of the text document are inserted. A text rendering protocol is executed to iteratively insert the words of the text document into the available locations of the object template. The typographical image is generated by rendering each word of the text document onto the available location assigned to the word.

20 Claims, 9 Drawing Sheets

SYSTEMS AND METHODS FOR GENERATING TYPOGRAPHICAL IMAGES OR VIDEOS

TECHNICAL FIELD

The present disclosure generally relates to automatically rendering typographical images or videos. More specifically, but not by way of limitation, the present disclosure relates to automatically generating a typographical image by detecting salient regions of an image and rendering user-inputted text within the salient regions to visually form portions of objects in the image.

BACKGROUND

Typography and font design have become a form of artistic expression. A typographical image may include text that visually forms objects in an image. Generating typographical images, however, is a tedious task, which often relies on significant user effort. For example, generating a typographical image using a graphic tool may involve a user carefully positioning text at or near edges of objects. Additionally, given the complexities of generating typographical images, the generation of typographical video illustrations has not been explored.

SUMMARY

Certain embodiments involve automatically generating typographical images by rendering text to form salient objects within an image. For example, an image and text data are each received at a typographical image generator. The typographical image generator detects a region of interest within the image using a trained neural network. The region of interest includes one or more salient objects of the image. A salient object is a region of pixels in an image that stands out or is noticeable (e.g., by a human observer). The typographical image generator also generates an object template using the detected region of interest. For example, the object template defines an area of the region of interest that can be filled with text. The defined areas are arranged or positioned to form the shape or contours of the salient object included in the region of interest. The typographical image generator automatically generates a typographical image by iteratively inserting words of the text data into the defined areas of the object template. The inserted text data may visually form the objects of the image. Implementations of the described techniques may include hardware, a method or process, or computer software on a computer-accessible medium.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
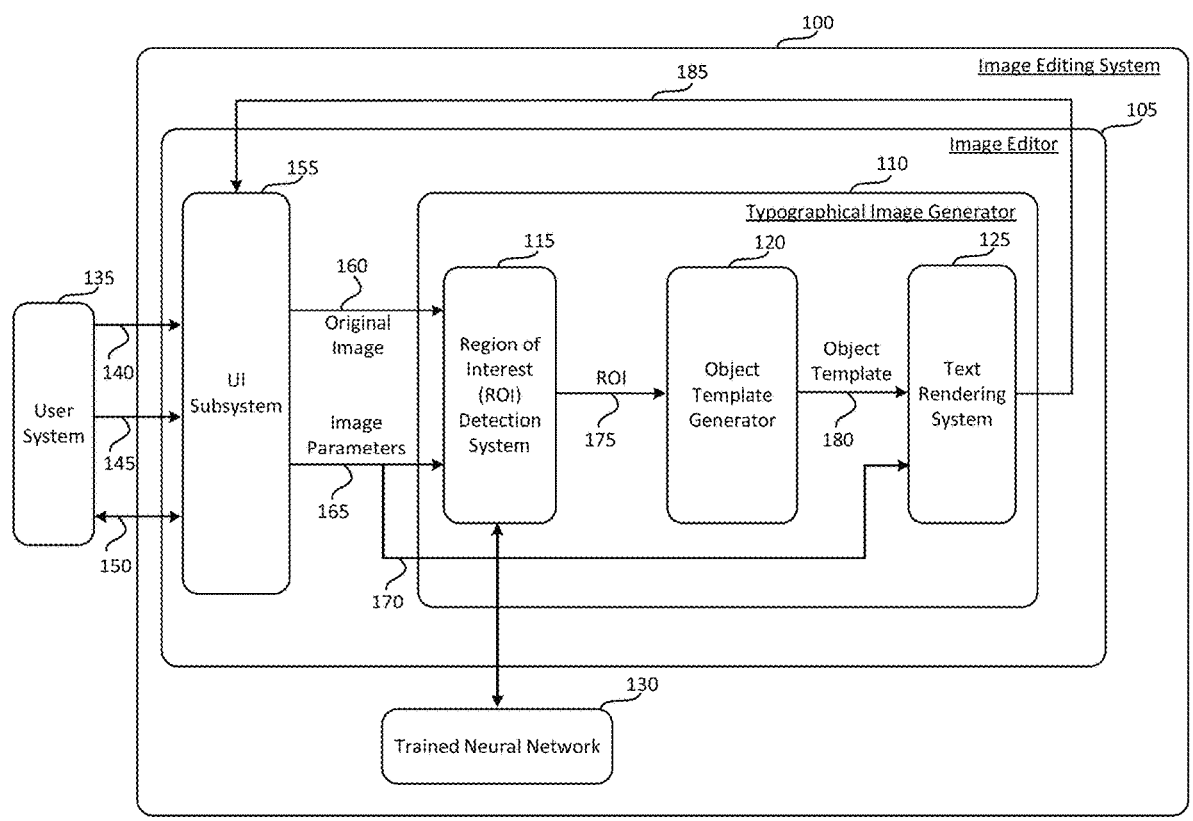
FIG. 1 depicts an example of a network environment for generating a typographical image or video, according to some aspects of the present disclosure.

The present disclosure relates to automatically generating a typographical image. A typographical image may render text to visually form an object or pattern within the image. The typographical image may be automatically generated by detecting a region of interest from an input image and extracting an object template from the detected region of interest. Detecting a region of interest includes passing the input image into a neural network having been trained to detect pixels of salient objects within digital images. An object template is a template comprising one or more defined areas that are fillable with text. The defined areas are arranged and positioned in a manner to form the shape of a salient object within an image. For instance, the object template defines areas of the region of interest that, if filled with text, would form an outline of an edge or contour of a salient object. The defined areas of the object template are determined by extracting edge pixels from the detected region of interest and applying morphological transformations to the extracted edge pixels. The morphological transformation creates defined areas that are aligned with the edges detected within the region of interest. Inserting the text data into the defined areas of the object template visually forms the contour of the object. An integral image of the object template may be generated to detect the coordinates of available spaces within the object template for inserting text. The individual words of the text may be iteratively inserted into the object template according to a text rendering protocol. Further, the size and orientation of each word inserted into the object template may be determined based on one or more factors (e.g., user-defined font size or font size based on word frequency). After each word is inserted into the object template, the integral image is generated again to detect the remaining available spaces for inserting the remaining words of the text. The rendering of the typographical image may be completed when the text has been inserted into the object template.

Certain embodiments may be described by the following non-limiting example. In this example, a user operates an image editor by selecting an image and a text document including song lyrics to generate a typographical image. The user also selects other preferences, such as font type and size. A typographical image generator receives the image and the text document. The typographical image generator feeds the image into a neural network trained to detect a region of interest from an image. The region of interest includes an object within the image. The typographical image generator then feeds the detected region of interest into an object template generator that extracts an object template from the detected region of interest. The object template generator extracts edge pixels from the detected region of interest and then executes morphological transformations on the edge pixels to generate the object template. A text rendering system then renders the typographical image by iteratively inserting the words of the text document into the available spaces in the object template. The text may be formatted according to the preferences defined by the user. Thus, the typographical image generator automatically generates a typographical image based on user-inputted image and text.

Certain aspects of the present disclosure relate to automatically generating typographical images or videos in a computationally efficient manner. For example, certain aspects of the present disclosure include locating available space for inserting text using an integral image, which improves the computational efficiency of generating the typographical images. The improved computational efficiency enables certain aspects of the present disclosure to be applied to image frames of a video to generate typographical illustrations on the video. Prior art video or image editing systems allow users to generate text-art collages by extracting a mask from an image. The user needs to repetitively add glyphs on the image to generate the final text-art collage. Thus, the prior art video or image editing systems does not enable users to automatically generate typographical images.

As described herein, the term "typographical image" refers to an image or an image frame of a video, in which text is visually presented to form an object or pattern of the image. Generating typographical images, according to certain aspects of the present disclosure, is automatic because the user does not need to manually add glyphs to an image. A user-selected image, which serves as the basis of the typographical image, may be any type of image captured by any type of camera or image sensor. Additionally, user-selected text, which is inserted into certain areas of the user-selected image, may be any text, including any American Standard Code for Information Interchange (ASCII) or numerical characters, or non-text, such as emojis or other effects. Further, as described herein, the region of interest may be detected using a trained neural network and then used to extract the object template. While the above example describes the automatic generation of a typographical image, the typography image generator may generate a plurality of typographical images. Each typographical image of the plurality of typographical images may differ from the other typographical images with respect to at least one feature, such as font size, font type, or text orientation.

FIG. 1 depicts an example of a network environment for generating a typographical image or video, according to some aspects of the present disclosure. For example, FIG. 1 illustrates an image editing system 100. In certain embodiments, the image editing system 100 provides an image editor 105 that incorporates a typographical image generator 110 for providing functionality for generating images, such as a typographical image or a typographical video, to a user. The user operates user system 135 to access the image editing system 100. The functionality for generating images includes image processing or image editing.

Figure 8:
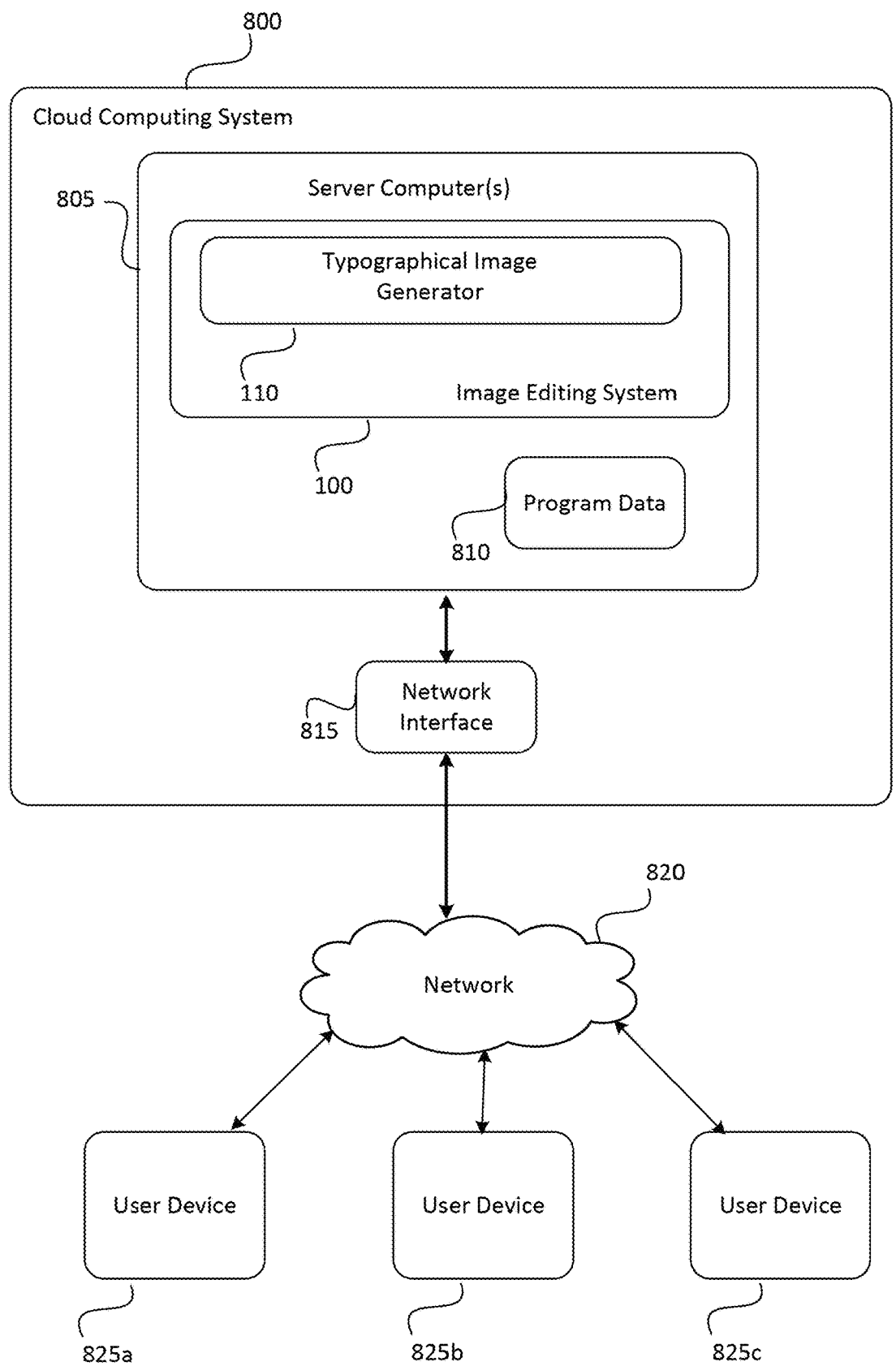
FIG. 8 depicts an example of a cloud computing system for implementing certain embodiments described herein.
Figure 9:
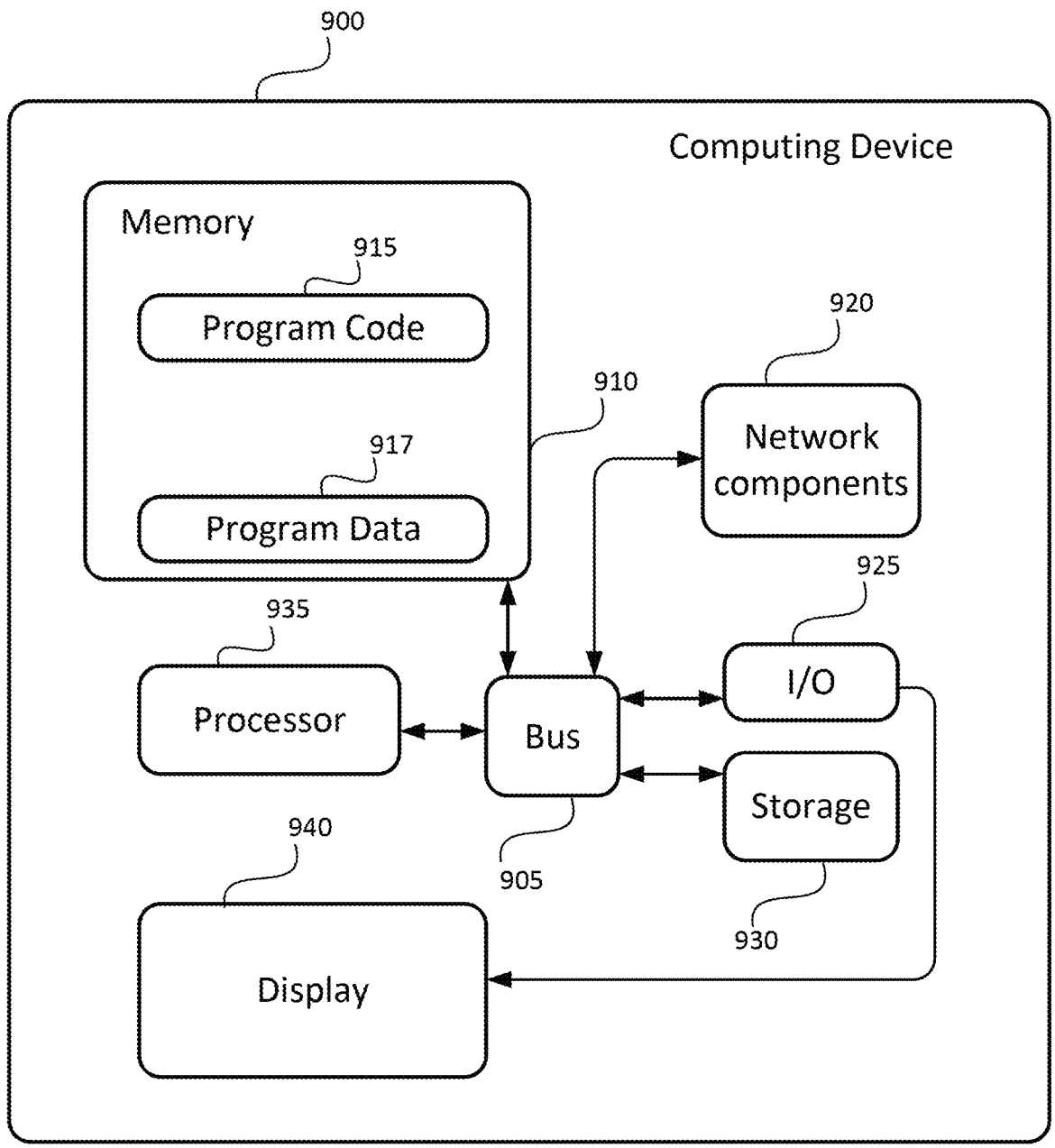
FIG. 9 depicts an example of a computing system for implementing certain embodiments described herein.

User system 135 may be any suitable computer system including, for example, any of user devices 825a-c of FIG. 8 and/or computing device 900 of FIG. 9. A user may utilize user system 135 to access the image editing system 100 via user interface (UI) subsystem 155.

Image editing system 100 may include any suitable computer system including, for example, server computer 805 of FIG. 8 and/or computing device 900 of FIG. 9. In certain embodiments, image editing system 100 provides users with image editing functionality, including an image editor 105. Image editing functionality may include the ability to generate images or to edit images regarding the size, shape, color, or any other attribute of an image or portion of an image. For example, as used throughout, image editor 105 is configured to provide users with functionality enabling the user to input an image or video and text (e.g., a document including text) to automatically generate as an output a typographical image or typographical images that form a typographical video. An example of a typographical image is described in more detail with respect to FIG. 7.

Further, a color grading refers to a set of values of color parameters of an image that has been enhanced by a user or defined by the camera that captured the image. For example, a user enhances the appearance of an image by modifying the values of color parameters of the image. Non-limiting examples of color parameters of the image may include the hue, luminance, saturation, gain, and any suitable color parameters used for image editing. In some implementations, the color parameters include three sets of color parameter values; one set of color parameter values for each of the various tones including highlight, midtone, and shadow (e.g., midtone hue or shadow saturation). The values of the color parameters of an image represent a color grading.

Image editor 105 may be implemented using software, hardware, firmware, or any combination thereof. In some implementations, the image editor 105 includes UI subsystem 155, which a user accesses using a user system 135. The image editor 105 also includes a typographical image generator 110 for performing some or all of the image editor 105 functionality (e.g., the automatic generation of a typographical image or video, as described herein).

In some implementations, typographical image generator 110 includes a region of interest (ROI) detection system 115, an object template generator 120, and a text rendering system 125. The ROI detection system 115 may be configured to detect a region of interest from an image using trained neural network 130. Trained neural network 130 may be a model trained using one or more machine-learning or artificial-intelligence techniques. The trained neural network 130 may be trained using a training data set to detect pixels of salient objects in digital images. For example, the ROI detection system 115 iteratively applies the trained neural network 130 to a digital image at a reduced resolution to automatically identify pixels of salient objects portrayed within the digital image. In some implementations, the ROI detection system 115 generates a reduced-resolution digital image from an input digital image and applies a neural network to identify a region corresponding to a salient object. The ROI detection system 115 then iteratively applies the trained neural network 130 to additional reduced-resolution digital images (based on the identified region) to generate one or more reduced-resolution segmentation maps that roughly indicate pixels of the salient object. In addition, the ROI detection system 115 performs post-processing based on the reduced-resolution segmentation map(s) and the input digital image to accurately determine pixels that correspond to the salient object. The detection of the region of interest is further described in U.S. Ser. No. 15/967,928, filed on May 1, 2018, the disclosure of which is hereby incorporated by reference in its entirety for all purposes.

The typographical image generator 110 also includes the object template generator 120, which is configured to extract an object template from the region(s) of interest detected by the ROI detection system 115. The object template generator 120 extracts the object template from the pixels representing the region(s) of interest by enhancing the contrast of the detected region(s) of interest using histogram equalization; extracts the edge pixels using, for example, an edge detection protocol, such as the Canny edge detection algorithm; and applies morphological transformations on the detected edge pixels to generate the object template. The object template defines areas within the region(s) of interest into which the text is to be inserted.

The typographical image generator 110 also includes the text rendering system 125, which is configured to render the text within the object template to generate the typographical image. The text rendering system 125 renders the text within the object template by executing a text rendering protocol. For example, the text rendering protocol may include computing an integral image of the object template. The integral image is an intermediate image representation that is generated to improve the execution speed for computing box filters. The integral image represents the available space for inserting text into the object template in terms of boxes. Further, the text rendering protocol sorts the words of the user-inputted text in an order. For example, the words of the user-inputted text may be sorted according to word frequency. The text rendering protocol assigns a maximum font size to the word with the highest frequency. Starting from the word with the highest word frequency, the text rendering protocol selects an orientation (e.g., horizontal or vertical) for the word. The text rendering protocol then uses an integral image fast search technique to detect a free location for the word (at the maximum font size and the selected orientation) within the object template. If a free location is detected by the integral image fast search technique, then the word is rendered within the detected free location of the object template and the integral image is partially re-generated. The re-generated integral image indicates that the free location, in which the word was inserted, is no longer a free location, and thus, is not available for inserting text. If a free location is not detected by the integral image fast search technique, then the text rendering protocol reduces the font size or changes the word orientation and uses the integral image fast search technique to detect another free location within the object template. This process continues iteratively for each word in the sorted list of the user-inputted text. When the sorted list of words of the user-inputted text has been inserted into the object template, the cached rendered textures are combined with the input image to generate the typographical image.

In some implementations, the user inputs a video, instead of an image, into the image editor 105. The image frames of the video may be extracted, and each individual image frame may be inputted into the typographical image generator 110 to generate a typographical image for the image frame. With user-inputted video, the text rendering system 125 performs the text rendering protocol, as described above. For each image frame after the first image frame of the video, however, the text rendering protocol does not initially perform the integral image fast search technique to detect a free location for the word to be inserted. Instead, for a given word, the text rendering protocol initially selects the free location detected from the previous image frame and determines whether the word (at the assigned font size and selected orientation) fits within that free location. If the word fits into the free location that was previously used in the last image frame, then the text rendering protocol can improve computational efficiency by avoiding the need to perform the integral image fast search. If the word does not fit into the free location that was previously used in the last frame, then the text rendering protocol performs the integral image fast search to detect another free location for inserting the word. Selecting the previously used free location from the last frame, instead of initially performing the integral image fast search, enhances the speed at which the typographical image is generated.

Accordingly, in use, beginning with user system 135, the user provides an image or video (indicated by arrow 140) and text (indicated by arrow 145) using a user interface that is displayed or provided on user system 135 via UI subsystem 155. The user also provides other image parameters (indicated by arrow 150), such as the user-preferred font type, the range of font sizes, the orientations preferred, and so on. The UI subsystem 155 receives the image or video and the image parameters (which includes the text), and provides the image or video (indicated by arrow 160) and the image parameters, including the text (indicated by arrow 165) as an input to the typographical image generator 110. The text is also be routed to the text rendering system 125, as indicated by arrow 170.

Once the typographical image generator 110 receives the user-selected image or video and the text, the typographical image generator 110 processes the image or video and the text to automatically generate a typographical image. The typographical image generator 110 transmits the typographical image to the UI subsystem 155 (as indicated by arrow 185) for display on or by the user system 135. Processing the image or video and the text includes passing the image or video and the text to the ROI detection system 115. The ROI detection system 115 feeds the image or an image frame of the video into the trained neural network 130 to detect the region(s) of interest within the image or image frame of the video. The ROI detection system 115 transmits the detected region(s) of interest to the object template generator 120 (as indicated by arrow 175). The object template generator 120 extracts an object template from the region(s) of interest detected by the ROI detection system 115. The object template generator 120 transmits the extracted object template to the text rendering system 125 (indicated by arrow 180). The text rendering system 125 receives the object template and the image parameters (including the user-selected text) and iteratively renders each word of the text into the object template according to the text rendering protocol. The combined renderings of each word of the text inserted into the object template forms the completed typographical image, which is transmitted back to the UI subsystem 155 (indicated by arrow 185).

The UI subsystem may then provide the typographical image received from the typographical image generator 110 to the user via the user interface on the user system 135. The user system 135 may operate the image editor 105 to further modify and finalize the typographical image.

Figure 2:
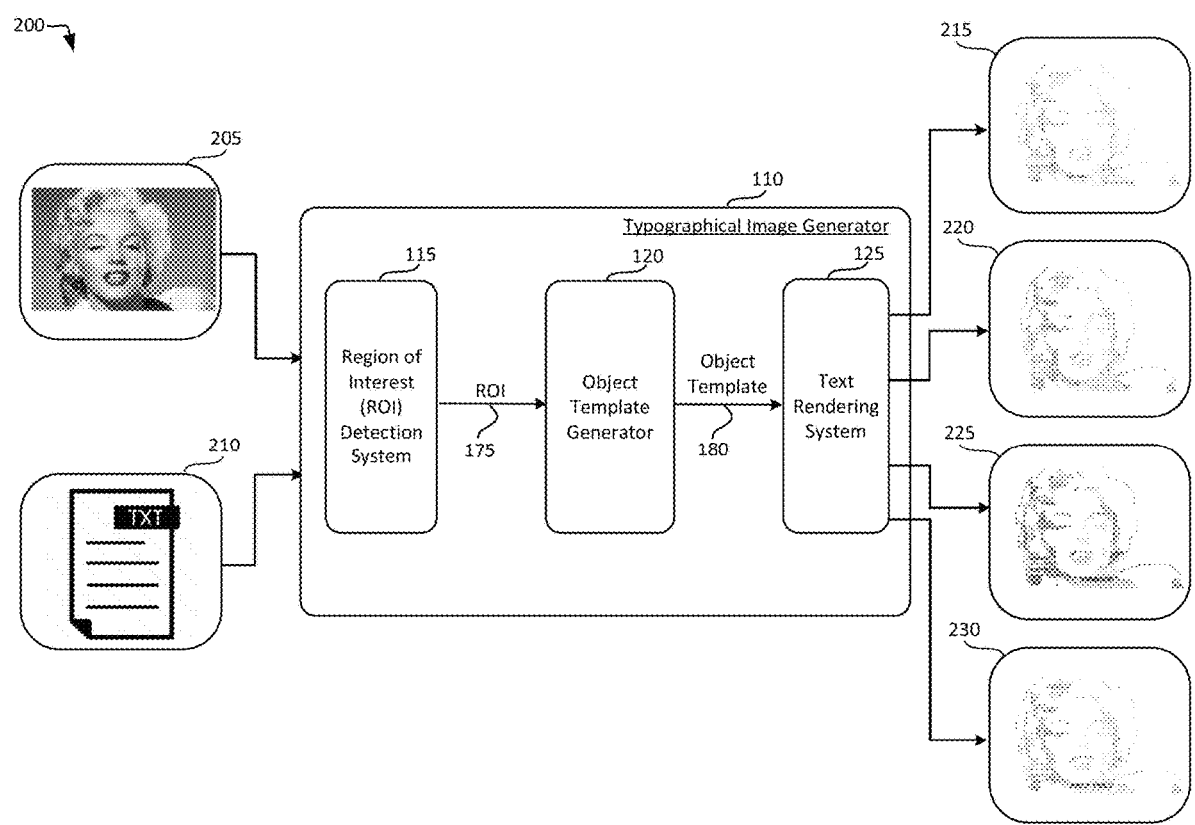
FIG. 2 depicts an example of a network environment for automatically generating a typographical image using user-inputted image and text, according to some aspects of the present disclosure.

FIG. 2 depicts an example of a network environment for automatically generating a typographical image using user-inputted image and text, according to some aspects of the present disclosure. The typographical image generator 110 in this example is configured to receive as inputs image 205 and text document 210, and in response, to automatically generate a plurality of typographical images 215 through 230. Process flow 200 may include a user-selected image 205, a user-selected text document 210, the ROI detection system 115, the object template generator 120, the text rendering system 125, and the plurality of typographical images 215 through 230, which were automatically generated by the typographical image generator 110.

The process flow 200 may begin with a user providing the image editing system 100 or the image editor 105 with an image 205 and a text document 210. The user may wish to perform the functionality (provided by the image editing system 100 or the image editor 105) of automatically generating a typographical image. Such image functionality may be automatically performed and may additionally include other functionality, for example, color mapping, sizing, shot-matching, and the like.

The process flow 200 may include receiving the image 205 and the text document 210 at the typographical image generator 110. As described with respect to FIG. 1, the typographical image generator 110 is configured to include the ROI detection system 115, the object template generator 120, and the text rendering system 125. Once the image 205 and the text document 210 are received at the ROI detection system 115, the ROI detection system 115 processes the image 205 to automatically detect region(s) of interest from the pixels of the image 205. The ROI detection system 115 inputs the image 205 into a trained deep learning neural network. In some implementations, the trained deep learning neural network is included within the ROI detection system 115. In other implementations, the trained deep learning neural network is external to the ROI detection system 115, but accessible by the ROI detection system 115, as the trained neural network 130 is in FIG. 1. The neural network is trained to detect pixels that represent salient objects within a digital image. For example, as described in U.S. Ser. No. 15/967,928, filed on May 1, 2018, which is incorporated herein by reference, the ROI detection system 115 generates a reduced-resolution image from the image 205 and inputs the reduced-resolution image into a trained neural network detect a region of the image 205, in which a salient object is portrayed. Further, the ROI detection system generates a reduced-resolution image of the identified region and inputs the reduced-resolution image of the identified region into the trained neural network to generate a reduced-resolution segmentation map of the salient object. Based on the reduced-resolution segmentation map and the image 205, the ROI detection system 115 generates a segmentation map (e.g., a high-resolution segmentation map at the resolution of the image 205) that identifies pixels within the image 205 that correspond to the salient object.

The process flow 200 includes transmitting the detected region(s) of interest, which is outputted from the ROI detection system 115, to the object template generator 120 (as indicated by arrow 175). The object template generator 120 extracts an object template from the detected region(s) of interest by enhancing the contrast of the detected region(s) of interest using histogram equalization; extracting the edge pixels from the contrast enhanced image using, for example, an edge detection protocol (e.g., the Canny edge detection algorithm); and applying morphological transformations on the detected edge pixels. The resulting object template defines areas of the region(s) of interest into which the words of the text document 210 will be iteratively inserted.

The process flow 200 includes transmitting the object template to the text rendering system 125 (as indicated by arrow 180). The text rendering system 125 executes a text rendering protocol to iteratively render each word of the text document 210 into the object template to generate the typographical images 215 through 230. The text rendering protocol begins by generating an integral image of the object template. The integral image is a summed-area table that the text rendering system 125 uses to recognize the free locations (e.g., the available squares) for inserting the words of the text document 210. The text rendering protocol then sorts the words of the text document 210 into an order. As a non-limiting example, the words of the text document 210 can be sorted by frequency. The present disclosure is not limited thereto, and thus, the words of the text document 210 can be sorted based on any factor(s). In some implementations, the sorting of the words of the text document 210 is user defined. In other implementations, the sorting of the words of the text document 210 is randomized.

For the first word in the sorted list, the text rendering protocol assigns the largest available font size. The user can define a range of font sizes for the typographical image. The text rendering protocol selects an orientation (e.g., horizontal or vertical) for the first word in the sorted list. In some implementations, the orientation of the word is selected at random. In other implementations, the orientation of the word is selected based on a predefined distribution of orientations. For example, the user can define an image parameter that requires 50% of the words of the text document to be inserted horizontally and the remaining 50% of the words to be inserted vertically. The text rendering protocol then uses an integral image fast search technique to detect a free location for the first word (at the maximum font size and the selected orientation) within the object template. If a free location is detected by the integral image fast search technique, then the first word is rendered within the detected free location of the object template and the integral image is partially re-generated. The re-generated integral image indicates that the free location, in which the first word was inserted, is no longer a free location, and thus, is not available for inserting subsequent words in the sorted list of words. If a free location that can fit the first word at the maximum font size and selected orientation is not detected by the integral image fast search technique, then the text rendering protocol reduces the font size or changes the word orientation and uses the integral image fast search technique to detect another free location within the object template. This process continues iteratively for each word in the sorted list of words. When the sorted list of words of the user-inputted text has been inserted into the object template, the cached rendered textures are combined with the input image to generate the typographical image.

The typographical image generator 110 generates a plurality of typographical images 215 through 230. Each typographical image of the plurality of typographical images 215 through 213 differs from the other typographical images. For example, the font type of the typographical image 215 may differ from the font type of the typographical image 220. As another example, the orientation of words in the typographical image 225 may different from the orientation of words in the typographical image 230.

Figure 3:
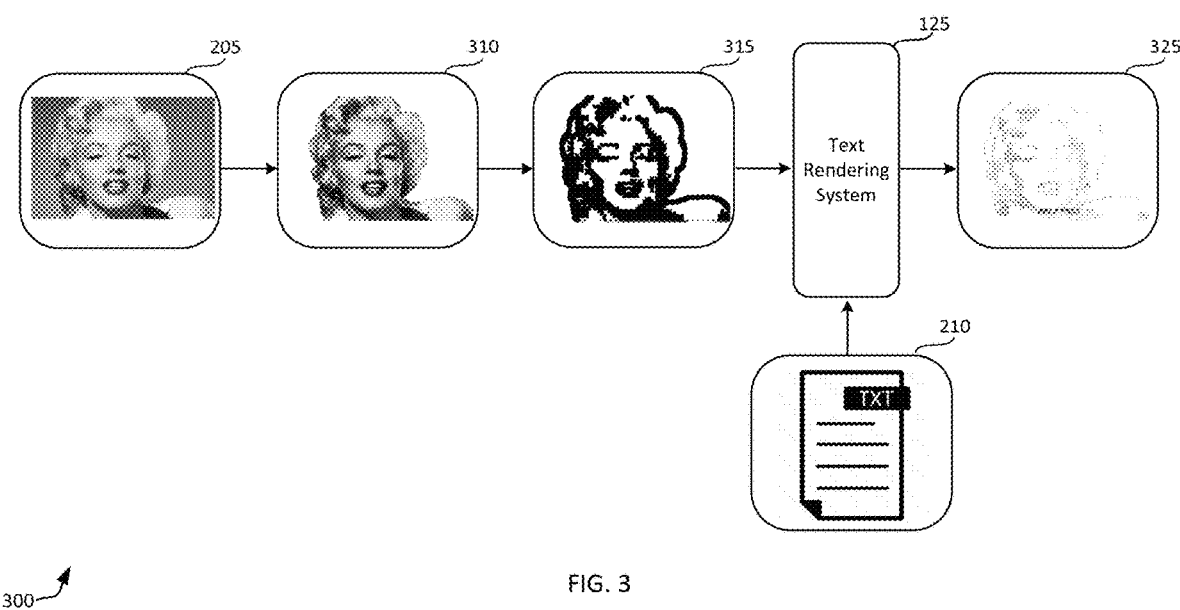
FIG. 3 depicts an example of a process flow for automatically generating a typographical image, according to some aspects of the present disclosure.

FIG. 3 depicts an example of a process flow 300 for automatically generating a typographical image 325. The process flow 300 begins with a user providing the image 205 and the text document 210 to the image editor 105. The image 205 may include an object, such as a salient object. For example, Marilyn Monroe is the object of image 205. The image editor 105 then passes the image 205 and the text document 210 to the ROI detection system. The ROI detection system inputs the input image 205 into a trained neural network to detect a region of interest 310 from within the image 205. As illustrated in FIG. 3, the region of interest 310 includes the pixels of the salient objects of the image 205 (e.g., the pixels of Marilyn Monroe, but excludes the background pixels of the image 205). In this example, the region of interest 310 includes the entirety of the object (e.g., all of the pixels of Marilyn Monroe without the background pixels). However, in some examples, the region of interest 310 includes a portion of the object (e.g., some, but not all pixels of Marilyn Monroe).

The process flow 300 includes transmitting the region of interest 310 to the object template generator. The object template generator generates a contrast-enhanced version of the region of interest 310 using histogram equalization techniques. The object template generator executes an edge detection protocol (e.g., the Canny edge detection algorithm), which detects edge pixels from the contrast-enhanced version of the region of interest 310. Enhancing the contrast of the region of interest 310 enables the objects within the region of interest 310 to become clearer and more distinguishable from other objects in the region of interest 310, which improves the edge detection performed by the object template generator. The detected edge pixels are transformed using morphological transformations to create the object template 315. The object template 315 defines areas in the image 205 that are available to insert words from the text document 210. In some implementations, the object template 315 is generated by computing the cumulative histogram of the grayscale image, selecting a percentage of the image to remove, and removing the regions of the image that have values brighter than a threshold value. The text rendering system 125 receives the object template 315 and the text document 210 and performs the text rendering protocol described with respect to FIG. 2. The typographical image 325 is the output of the text rendering system 125 performing the text rendering protocol using the object template 315 and the text document 210.

Figure 4:
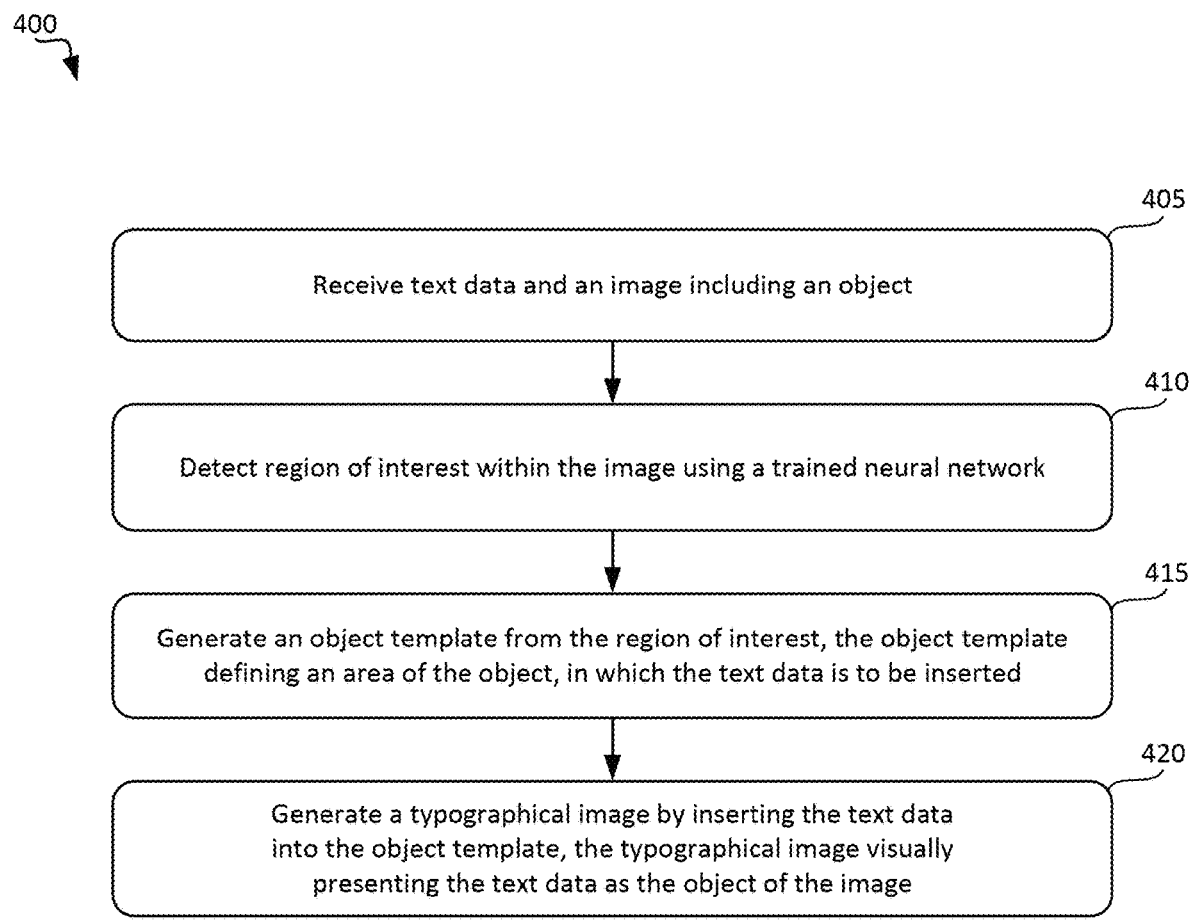
FIG. 4 depicts an example of a process for generating a typographical image, according to some aspects of the present disclosure.

FIG. 4 depicts an example of a process 400 for generating a typographical image, according to some aspects of the present disclosure. The process 400 may be performed at least in part by any of the hardware-based computing devices illustrated in FIGS. 1-2 or FIGS. 8-9. For example, the process 400 may be performed by one or more servers included in the image editing system 100, the image editor 105, or the typographical image generator 110. As a further example, image editor 105 may perform the process 400 as part of an image editing functionality, such as automatically generating typographical images.

The process 400 may begin at block 405, for example, where the image editing system 100 or the image editor 105 may access a typographical image generator to perform an image editing function, such as automatically generating a typographical image or video. A user may operate the image editing system 100 or the image editor 105 by selecting text data and an image including an object. The image can be a digital image including color or black-and-white pixels. The text data may including any text, such as letters, numbers, or any ASCII characters.

At block 410, the typographical image generator may pass the text data and the image to the ROI detection system. The ROI detection system may receive the text data and the image, and input the image into a trained neural network. The neural network may be trained to detect pixels of salient objects within the image. The image includes an object, and thus, the trained neural network may detect the object within the image and exclude the background pixels. The pixels of the salient object within the image may represent the region of interest (e.g., region of interest 310).

At block 415, the detected pixels of the region of interest may be transmitted to the object template generator, which is configured to extract an object template from the pixels of the region of interest. The object template may define areas of the image, in which the text is inserted according to the text rendering protocol. The text is inserted within the object template to provide an effect of placing the text to visually form the object included in the image.

At block 420, the object template and the text data is transmitted to the text rendering system perform a text rending protocol on the text data and the object template to generate a typographical image. The typographical image visually presents the words of the text data to form the object of the image. The process for generating the object template is described in greater detail with reference to FIG. 5 below.

Figure 5:
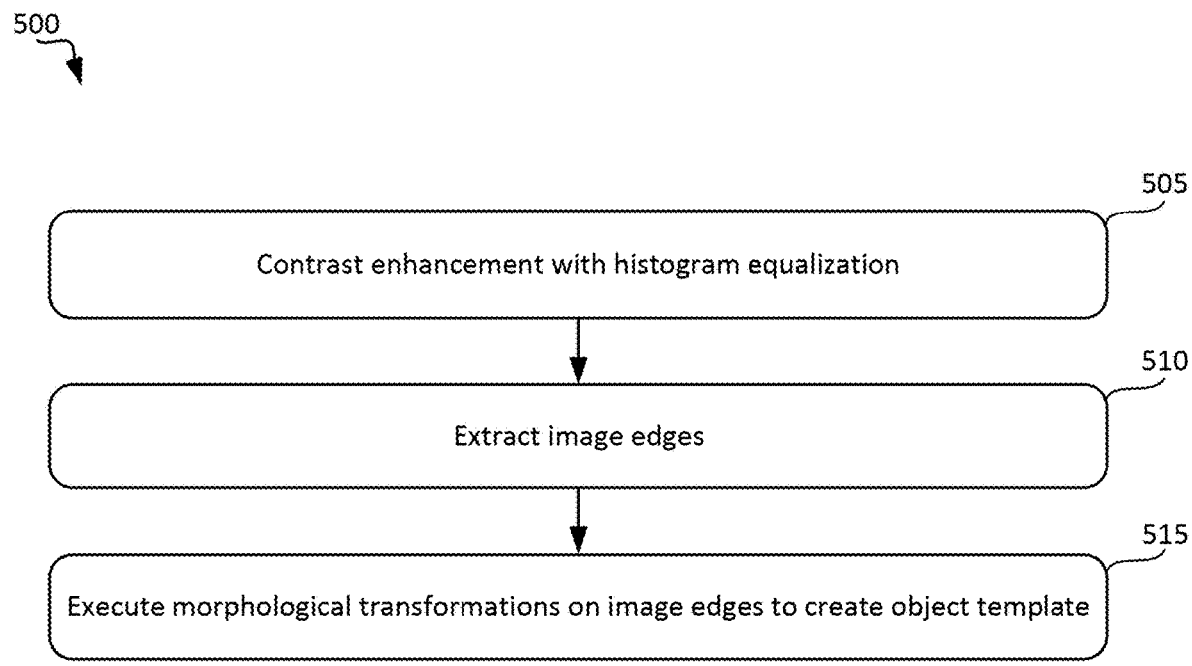
FIG. 5 depicts an example of a process for generating an object template for the typographical image, according to some aspects of the present disclosure.

FIG. 5 depicts an example of a process 500 for generating an object template for the typographical image, according to some aspects of the present disclosure. The process 500 may be performed at least in part by any of the hardware-based computing devices illustrated in FIGS. 1-2 or FIGS. 8-9. For example, the process 500 may be performed by one or more servers included in the image editing system 100. As a further example, the image editing system 100 may perform the process 500 to generate an object template, which defines areas of the region of interest, in which text can be inserted to generate the typographical image.

The process 500 may begin at block 505, for example, where the object template generator receives the region of interest (e.g., the region of interest 310) from the ROI detection system. Further, at block 505, the object template generator may generate a contrast-enhanced version of the detected region of interest. For example, the object template generator may enhance the contrast of the detected region of interest using histogram equalization. Enhancing the contrast of the region of interest enables the object template generator to improve edge detection due to the objects within the image becoming more distinguishable from each other.

At block 510, the object template generator extracts edge pixels from the detected region of interest using an edge detection protocol. Non-limiting examples of the edge detection protocol include the Sobel Edge Detection Algorithm, Prewitt Edge Detection Algorithm, Roberts Edge Detection Algorithm, Laplacian Edge Detection Algorithm, and the Canny Edge Detection Algorithm.

At block 515, the object template generator executes one or more morphological transformations on the edge pixels detected at block 510. Non-liming examples of morphological transformations include erosion, dilation, opening, closing, and gradient. The morphological transformation(s) may transform the detected edge pixels of the detected region of interest (e.g., the edge pixels of the region of interest 310) into the object template (e.g., the object template 315).

Figure 6:
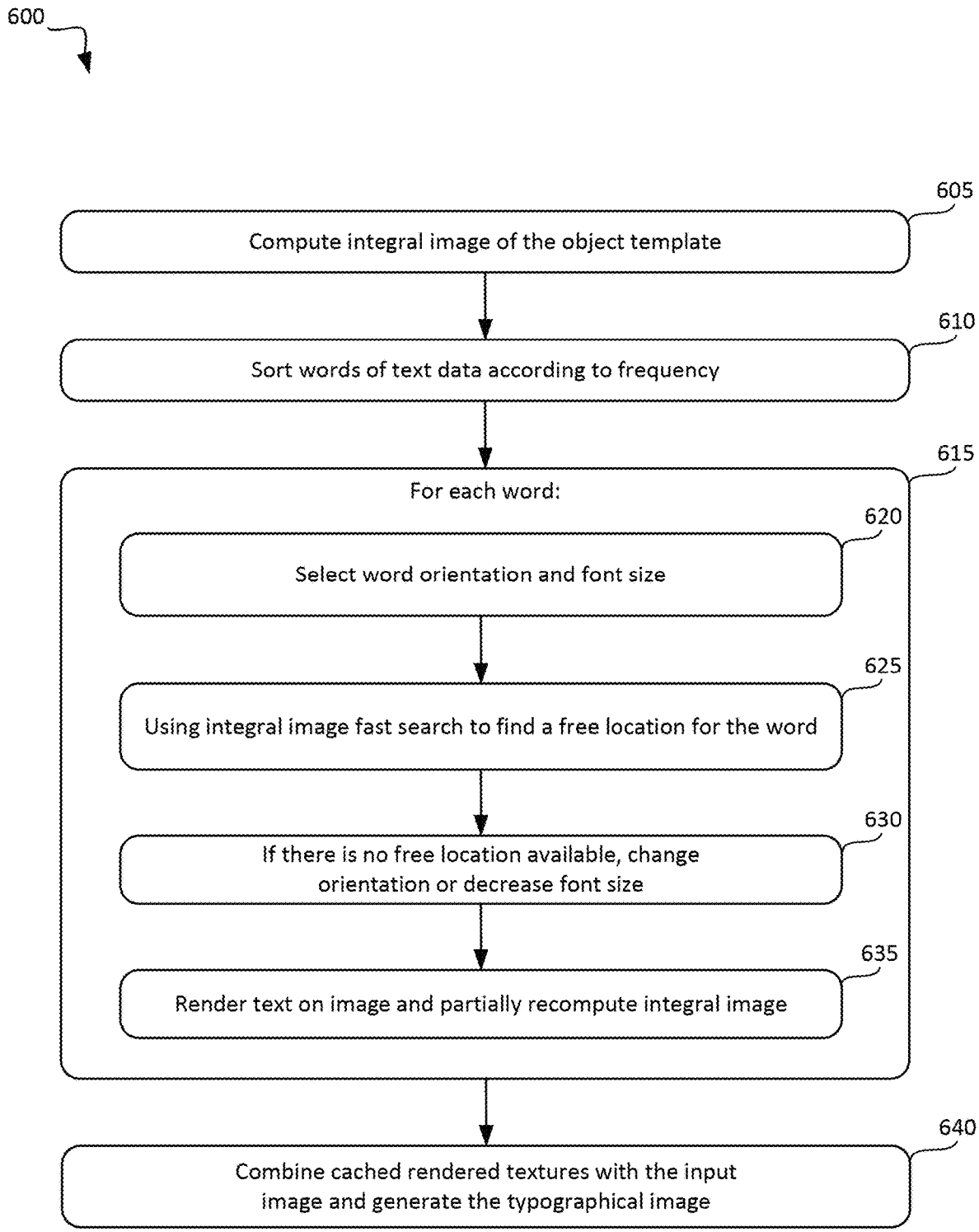
FIG. 6 depicts an example of a process for inserting text into the object template to generate the typographical image, according to some aspects of the present disclosure.

FIG. 6 depicts an example of a process 600 for inserting text into the object template to generate the typographical image, according to some aspects of the present disclosure. The process 600 may be performed at least in part by any of the hardware-based computing devices illustrated in FIGS. 1-2 or FIGS. 8-9. For example, the process 600 may be performed by one or more servers included in the image editing system 100. As a further example, the image editing system 100 may perform the process 600 to automatically and iteratively insert words of the user-selected text document into the object template generated by the object template generator.

At block 605, the text rendering system generates an integral image of the object template. The integral image indicates which areas (e.g., in units of a square) of the object template are available for inserting text, and which areas are not available for text to be inserted. At block 610, the words of the user-selected text document are sorted according to a factor, such a frequency. The most frequent word in the text document may be the word presented in the typographical image with the largest font size. The font size may be decreased for every subsequent word in the sorted list of words.

At block 615, each word of the sorted list of words is processed according to blocks 620, 625, 630, and 635. At block 620, for a given word in the sorted list of words, the font size and the orientation of the word (e.g., horizontal or vertical) is selected. In some implementations, the user defines the font size of a word (or at least the font size range for the text). In other implementations, the font size or the orientation of the word is randomly selected. In some implementations, the font size may be selected for each word by reducing the font size for each subsequent word in the sorted list of words of the text data. At block 625, the text rendering protocol includes using the integral image fast search to find a free location for the word. The integral image fast search enables a free square of the object template to be identified by testing the availability of four pixels in the object template. At block 630, if the integral image fast search does not detect a free square within the object template for the selected font size and orientation of the word, then the font size of the word may be reduced or the orientation or the orientation of the word may be changed. The integral image fast search may be performed again using the reduced font size or changed orientation.

If a free square of the object template is found and the free square fits the font size and the orientation of the word, then at block 635, the word is rendered on the object template at the location of the free square. The integral image is also re-computed or re-generated to show the free square (into which the word was inserted) as not being available. In addition, at block 640, the cached renderings of each word inserted into the object template may be combined to generate the final typographical image.

Figure 7:
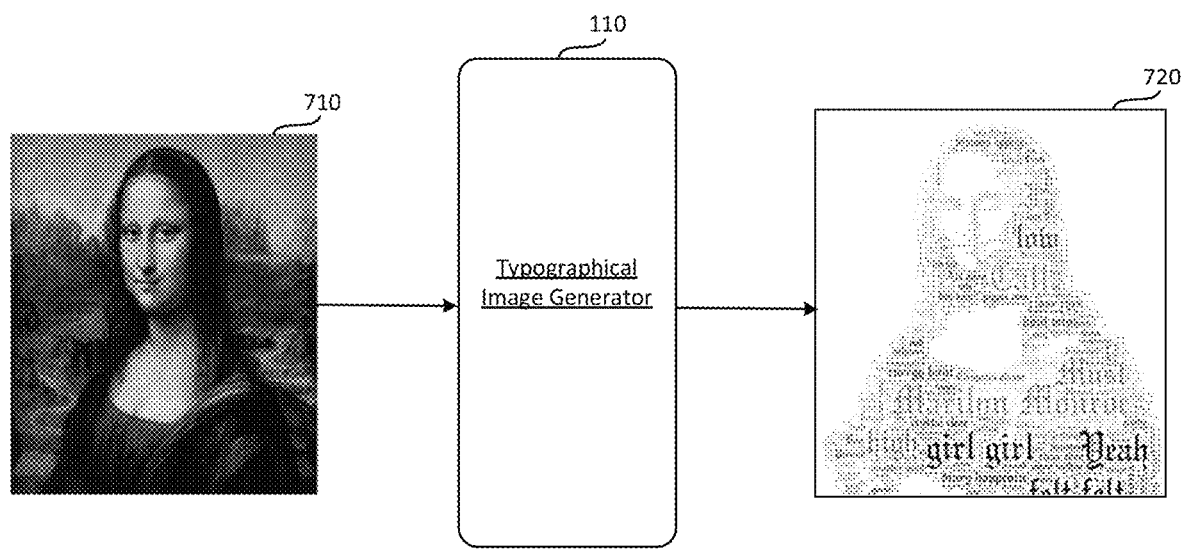
FIG. 7 depicts an example of the typographical image generator outputting a typographical image, according to some aspects of the present disclosure.

FIG. 7 depicts an example of the typographical image generator outputting a typographical image, according to some aspects. The user operates the image editor 105 to perform the function of automatically generating a typographical image. As part of performing the functionality, the user selects input image 710 and text data (not shown) as inputs to the typographical image generator 110. The typographical image generator 110 automatically detects the pixels of salient objects (e.g., the region of interest) from the image 710 using a trained deep learning neural network. The edge pixels are extracted from the pixels of the salient objects, and the edge pixels are transformed using morphological transformations to generate an object template. The words of the text document are iteratively rendered onto the object template according to a text rendering protocol. The final typographical image 720 is generated when the words of the text have been rendered onto the object template.

Examples of Computing Environments for Implementing Certain Embodiments

Any suitable computing system or group of computing systems can be used for performing the operations described herein. For example, FIG. 9 depicts an example of computing device 900 that may be at least a portion of image editing system 100. The implementation of the computing device 900 could be used for one or more of the image editor 105 or the user system 135. In an embodiment, a single image editing system 100 having devices similar to those depicted in FIG. 9 (e.g., a processor, a memory, etc.) combines the one or more operations and data stores depicted as separate subsystems in FIG. 1. Further, FIG. 8 illustrates a cloud computing system 800 by which at least a portion of the image editing system 100 may be offered.

In some embodiments, the functionality provided by the image editing system 100 may be offered as cloud services by a cloud service provider. For example, FIG. 8 depicts an example of a cloud computing system 800 offering an image editing service that can be used by a number of user subscribers using user devices 825a, 825b, and 825c across a data network 820. In the example, the image editing service may be offered under a Software as a Service (SaaS) model. One or more users may subscribe to the image editing service, and the cloud computing system performs the processing to provide the image editing service to subscribers. The cloud computing system may include one or more remote server computers 805.

The remote server computers 805 include any suitable non-transitory computer-readable medium for storing program code (e.g., an image editing system 100) and program data 810, or both, which is used by the cloud computing system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 805 can include volatile memory, non-volatile memory, or a combination thereof.

One or more of the servers 805 execute the program code 810 that configures one or more processors of the server computers 805 to perform one or more of the operations that provide image editing services, including the ability to utilize the typographical image generator 110 to perform the automatic generation of typographical images and other image editing techniques. As depicted in the embodiment in FIG. 8, the one or more servers providing the services to perform image editing via the typographical image generator 110 may include access to the models of the typographical image generator 110 including the trained neural network 130. Any other suitable systems or subsystems that perform one or more operations described herein (e.g., one or more development systems for configuring an interactive user interface) can also be implemented by the cloud computing system 800.

In certain embodiments, the cloud computing system 800 may implement the services by executing program code and/or using program data 810, which may be resident in a memory device of the server computers 805 or any suitable computer-readable medium and may be executed by the processors of the server computers 805 or any other suitable processor.

In some embodiments, the program data 810 includes one or more datasets and models described herein. Examples of these datasets include image data, new image content, image energy data, etc. In some embodiments, one or more of data sets, models, and functions are stored in the same memory device. In additional or alternative embodiments, one or more of the programs, data sets, models, and functions described herein are stored in different memory devices accessible via the data network 815.

The cloud computing system 800 also includes a network interface device 815 that enable communications to and from cloud computing system 800. In certain embodiments, the network interface device 815 includes any device or group of devices suitable for establishing a wired or wireless data connection to the data networks 820. Non-limiting examples of the network interface device 815 include an Ethernet network adapter, a modem, and/or the like. The image editing system 100 is able to communicate with the user devices 825a, 825b, and 825c via the data network 820 using the network interface device 815.

FIG. 9 illustrates a block diagram of an example computer system 900. Computer system 900 can be any of the described computers herein including, for example, image editor 105, user system 135, or server computer 805. The computing device 900 can be or include, for example, a laptop computer, desktop computer, tablet, server, or other electronic device.

The computing device 900 can include a processor 935 interfaced with other hardware via a bus 905. A memory 910, which can include any suitable tangible (and non-transitory) computer readable medium, such as RAM, ROM, EEPROM, or the like, can embody program components (e.g., program code 915) that configure operation of the computing device 900. Memory 910 can store the program code 915, program data 917, or both. In some examples, the computing device 900 can include input/output ("I/O") interface components 925 (e.g., for interfacing with a display 940, keyboard, mouse, and the like) and additional storage 930.

The computing device 900 executes program code 915 that configures the processor 935 to perform one or more of the operations described herein. Examples of the program code 915 include, in various embodiments, the typographical image generator 110, the image editing function, or any other suitable systems or subsystems that perform one or more operations described herein (e.g., one or more development systems for configuring an interactive user interface). The program code 915 may be resident in the memory 910 or any suitable computer-readable medium and may be executed by the processor 940 or any other suitable processor.

The computing device 900 may generate or receive program data 917 by virtue of executing the program code 915. For example, image 205, text document 210, and other image parameters are all examples of program data 917 that may be used by the computing device 900 during execution of the program code 915.

The computing device 900 can include network components 920. Network components 920 can represent one or more of any components that facilitate a network connection. In some examples, the network components 920 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 920 can be wired and can include interfaces such as Ethernet, USB, or IEEE 1394.

Although FIG. 9 depicts a single computing device 900 with a single processor 935, the system can include any number of computing devices 900 and any number of processors 935. For example, multiple computing devices 900 or multiple processors 935 can be distributed over a wired or wireless network (e.g., a Wide Area Network, Local Area Network, or the Internet). The multiple computing devices 900 or multiple processors 935 can perform any of the steps of the present disclosure individually or in coordination with one another.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method comprising:
   receiving an image including an object;

receiving text data;
detecting a region of interest within the image using a trained neural network, the region of interest including the object;
creating one or more defined areas aligned with one or more edges within the region of interest by applying a morphological transformation on the one or more edges to generate an object template from the region of interest, the object template defining an area of the object, in which the text data is to be inserted; and
inserting the text data into the object template to visually form a contour of the object of the image.

2. The computer-implemented method of claim 1, wherein generating the object template further comprises:
performing a contrast enhancement on the region of interest; and
detecting the one or more edges within the region of interest based on the contrast enhancement.

3. The computer-implemented method of claim 1, wherein the text data includes one or more words, and wherein inserting the text data further comprises:
generating an integral image of the object template;
sorting the one or more words of the text data according to frequency; and
iteratively inserting each word of the one or more words into the object template by:
selecting a font size;
selecting a word from the one or more sorted words;
selecting an orientation for the selected word;
selecting an empty portion of the object template by executing an integral image fast search technique;
inserting the selected word at the selected font size into the selected empty portion of the object template; and
generating a new integral image of the object template including the selected word inserted at the selected empty portion.

4. The computer-implemented method of claim 3, wherein inserting the text data further comprises:
determining that the object template does not include any space for the selected word at the selected font size;
reducing the selected font size;
re-executing the integral image fast search technique;
selecting, as an output of re-executing the integral image fast search technique, a new empty portion of the object template;
inserting the selected word at the reduced font size into the new empty portion of the object template; and
generating a new integral image of the object template including the selected word inserted at the new empty portion.

5. The computer-implemented method of claim 1, wherein inserting the text data includes generating a plurality of typographical images, each typographical image of the plurality of typographical images differing visually from remaining typographical images of the plurality of typographical images.

6. The computer-implemented method of claim 1, further comprising:
receiving an image parameter; and
modifying a characteristic of the text data according to the image parameter.

7. The computer-implemented method of claim 1, wherein the image is an image frame of a plurality of image frames of a video feed, and wherein a typographical image is generated for each image frame of the plurality of image frames.

8. A system, comprising:
one or more processors; and
a non-transitory computer-readable storage medium containing instructions which, when executed on the one or more processors, cause the one or more processors to perform operations including:
receiving a video feed including a plurality of image frames;
receiving text data;
detecting, using a neural network, a region of interest within an image frame of the plurality of image frames of the video feed;
creating one or more defined areas aligned with one or more edges within the region of interest by applying a morphological transformation on the one or more edges to generate a template from the region of interest, the template defining an area of the image frame, in which the text data is to be inserted; and
inserting the text data into the template, the text data visually forming an object of a typographical image.

9. The system of claim 8, wherein the operation of generating the template further comprises:
performing a contrast enhancement on the region of interest; and
detecting the one or more edges within the region of interest based on the contrast enhancement.

10. The system of claim 8, wherein the text data includes one or more words, and wherein generating the typographical image further comprises:
generating an integral image of the template;
sorting the one or more words of the text data according to frequency; and
iteratively inserting each word of the one or more words into the template by:
selecting a font size;
selecting a word from the one or more sorted words;
selecting an orientation for the selected word;
selecting an empty portion of the template by executing an integral image fast search technique;
inserting the selected word at the selected font size into the selected empty portion of the template; and
generating a new integral image of the template including the selected word inserted at the selected empty portion.

11. The system of claim 10, wherein the operation of generating the typographical image further comprises:
determining that the template does not include any space for the selected word at the selected font size;
reducing the selected font size;
re-executing the integral image fast search technique;
selecting, as an output of re-executing the integral image fast search technique, a new empty portion of the template;
inserting the selected word at the reduced font size into the new empty portion of the template; and
generating a new integral image of the template including the selected word inserted at the new empty portion.

12. The system of claim 8, wherein the operation of generating the typographical image further includes generating a plurality of typographical images, each typographical image of the plurality of typographical images differing visually from remaining typographical images of the plurality of typographical images.

13. The system of claim 8, wherein the operations further comprise:
receiving an image parameter; and modifying a characteristic of the text data according to the image parameter.

14. The system of claim 8, wherein the typographical image is generated for each image frame of the plurality of image frames.

15. A computer-program product tangibly embodied in a non-transitory machine-readable storage medium, including instructions configured to cause a processing apparatus to perform operations including:
    receiving an image including one or more edges;
    receiving text data;
    detecting a region of interest within the image using a trained neural network, the region of interest including the one or more edges;
    creating one or more defined areas aligned with one or more edges within the region of interest by applying a morphological transformation on the one or more edges to generate an edge template from the region of interest, the edge template defining an area of the image, in which the text data is to be inserted; and
    inserting the text data into the edge template creating a typographical image that visually presents the text data as the one or more edges of the image.

16. The non-transitory machine-readable storage medium of claim 15, wherein the operation of generating the edge template further comprises:
    performing a contrast enhancement on the region of interest; and
    detecting the one or more edges within the region of interest based on the contrast enhancement.

17. The non-transitory machine-readable storage medium of claim 15, wherein the text data includes one or more words, and wherein the operation of generating the typographical image further comprises:
    generating an integral image of the edge template;
    sorting the one or more words of the text data according to frequency; and
    iteratively inserting each word of the one or more words into the edge template by:
        selecting a font size;
        selecting a word from the one or more sorted words;
        selecting an orientation for the selected word;
        selecting an empty portion of the edge template by executing an integral image fast search technique;
        inserting the selected word at the selected font size into the selected empty portion of the edge template; and
        generating a new integral image of the edge template including the selected word inserted at the selected empty portion.

18. The non-transitory machine-readable storage medium of claim 17, wherein the operation of generating the typographical image further comprises:
    determining that the edge template does not include any space for the selected word at the selected font size;
    reducing the selected font size;
    re-executing the integral image fast search technique;
    selecting, as an output of re-executing the integral image fast search technique, a new empty portion of the edge template;
    inserting the selected word at the reduced font size into the new empty portion of the edge template; and
    generating a new integral image of the edge template including the selected word inserted at the new empty portion.

19. The non-transitory machine-readable storage medium of claim 15, wherein generating the typographical image including generating a plurality of typographical images, each typographical image of the plurality of typographical images differing visually from remaining typographical images of the plurality of typographical images.

20. The non-transitory machine-readable storage medium of claim 15, further comprising:
    receiving an image parameter; and
    modifying a characteristic of the text data according to the image parameter.

\* \* \* \* \*